Oct. 25, 1938. T. A. MITCHELL 2,134,528
TREATMENT OF LEAD BEARING ORES AND THE PREPARATION OF COMPOUNDS THEREFROM
Filed Jan. 10, 1935
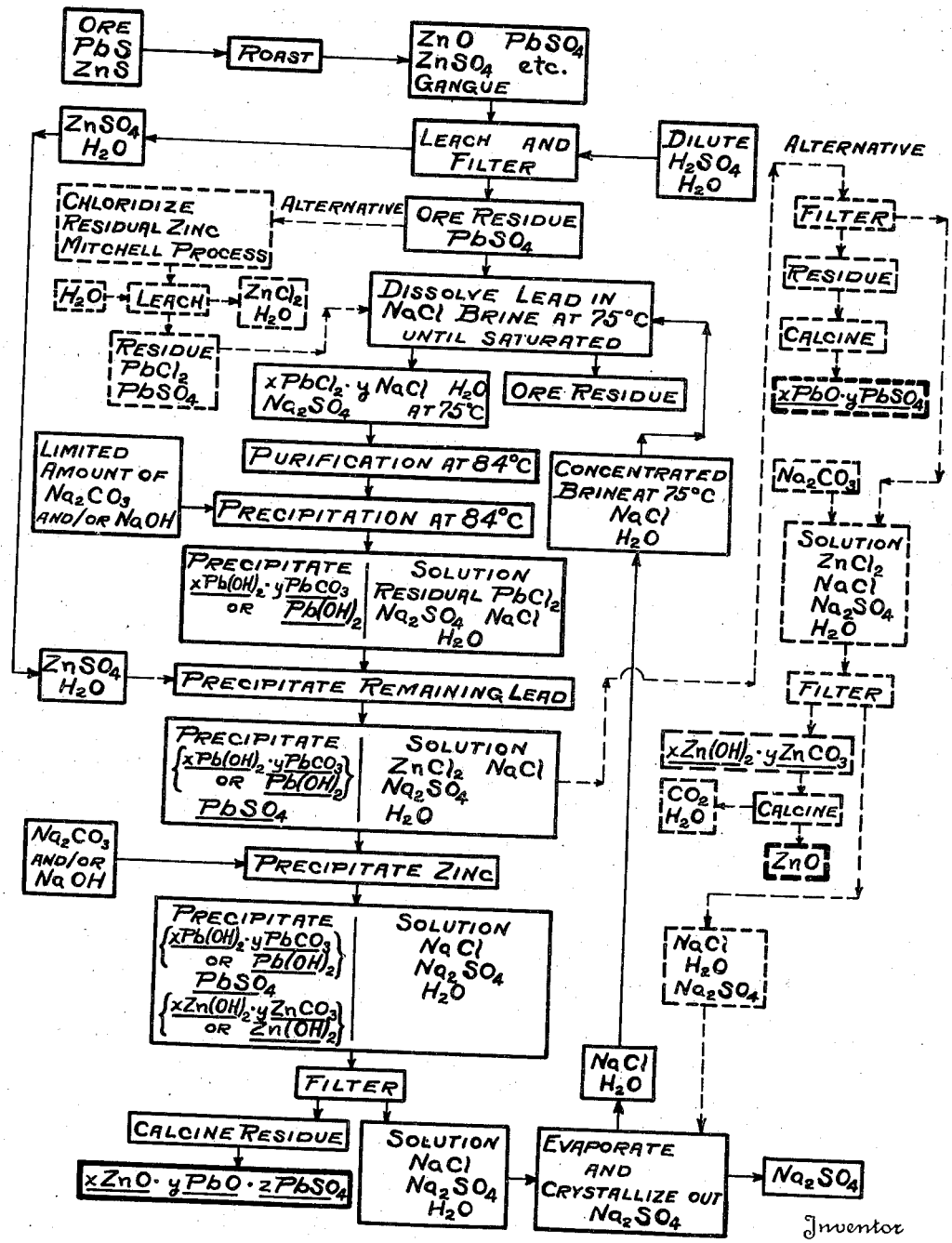
Inventor
THOMAS A. MITCHELL
By Clayton R. Jenks
Attorney Patented Oct. 25, 1938

2,134,528

UNITED STATES PATENT OFFICE 2,134,528

TREATMENT OF LEAD BEARING ORES AND THE PREPARATION OF COMPOUNDS THEREFROM

Thomas A. Mitchell, Inglewood, Calif., assignor to Hughes-Mitchell Processes, Incorporated, Denver, Colo., a corporation of Wyoming Application January 10, 1935, Serial No. 1,185

13 Claims. (Cl. 134—67)

This invention relates to the recovery of lead and zinc from ores and to the production from such ores of various compounds, and pigments in particular, which contain various proportions of lead and zinc, and especially those compounds known as leaded zinc oxide, sublimed white lead, lead oxysulfate and basic lead sulfate.

A typical analysis of a pigment of this general class, which may contain from zero to several per cent of zinc oxide, is as follows:

| | Per cent by weight |
|---|---|
| $PbSO_4$ | 78.5 |
| PbO | 16.5 |
| ZnO | 5.0 |

The amounts of these various ingredients may be varied at will, depending upon the requirements of the paint maker. If zinc is absent, the product is a mixture or combination of $xPbO$ and $yPbSO_4$. If zinc is present, the pigment may be considered to be a compound or mixture corresponding with the general formula

$xZnO.yPbO.zPbSO_4$;

but all of these compounds will be herein considered as basic lead sulfates.

This invention has for its primary object the provision of a process which serves economically and efficiently for making such products of desired properties and required composition.

A further object involves the direct treatment of a complex ore material containing lead and zinc compounds, which may be present as sulfides, sulfates, etc., in such a manner that the various ingredients cooperate with one another for the production of the desired end products. Further objects will be apparent in the following disclosure.

In accordance with this invention, lead and zinc carbonates and/or hydroxides, or basic carbonates, may be serially precipitated together with lead sulfate, and the combined precipitate thereafter calcined to produce the required compound. In order to introduce zinc into the product, it is preferred to precipitate the lead sulfate by means of zinc sulfate and then in turn to throw down the zinc in the presence of the lead compounds. The lead may be in an aqueous solution of a chloride, nitrate, acetate or any other suitable soluble lead compound, but the preferred ore treatment involves dissolving lead sulfate and/or chloride from the ore material in a hot salt brine, such as sodium chloride or its equivalent, potassium chloride. This process is particularly applicable to the treatment of a complex lead and zinc ore in which the zinc therein aids in forming the desired lead sulfate as well as entering itself into the required product.

In the preferred process, a lead and zinc sulfide ore is so treated as to obtain a water solution of zinc sulfate and a hot alkali metal chloride solution of lead sulfate and/or chloride. The lead salt in solution is first treated with a reagent furnishing carbonate and/or hydroxyl ions, such as sodium hydroxide and/or sodium carbonate, or the corresponding equivalent potassium salt, which is limited in amount to precipitate the desired proportion of lead hydroxide or carbonate from the solution. Then, the residual lead salt in solution may be precipitated as a sulfate by means of the zinc sulfate, which is preferably added to the pulp of lead precipitate and solution. The term "pulp" is used herein as referring to the mixture of precipitate and the resultant solution which are present at the end of a precipitation step. Thereafter, any desired amount of zinc may be incorporated in this precipitate by treating the pulp of the combined precipitate and zinc salt solution with carbonate and/or hydroxyl ions, such as found in caustic soda and/or sodium carbonate. Either combination precipitate, with or without the zinc compound, may then be calcined to provide a product comprising

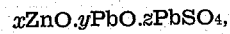
$xZnO.yPbO.zPbSO_4$, in which the content of zinc may be zero, if desired, and the proportions of all of the ingredients may be varied at will. It is preferable to treat the pulp of precipitate and associated solution with the zinc sulfate.

In order that all of the various features of this invention may be fully understood, reference is made to the accompanying drawing which shows as a flow diagram how these products may be derived from a zinc and lead sulfide ore; but it will be appreciated that various phases of this invention may be employed without reference to the treatment of an ore and irrespective of the sources of the zinc and lead salts used in the reactions.

Assuming that the ore contains lead and zinc sulfide, together with various other compounds, this ore may be roasted in accordance with standard or any suitable procedure to form zinc oxide and/or zinc sulfate together with lead sulfate. By leaching the roasted ore material with dilute sulfuric acid of suitable strength, the zinc oxide and/or zinc sulfate may be readily dissolved and thus recovered for use in the process. This operation may be carried on by using the leaching liquor repeatedly until the zinc sulfate solution is of the required concentration. If desired, the roasted ore may be placed in a vat and there treated with an aqueous solution of the solute to which sulfuric acid is added. Thereafter, the solution is separated from the residue by filtration or any equivalent procedure. The recovery of any residual zinc in the ore residue, if such is present, may be suitably accomplished, but it is desirable that all of the soluble zinc compounds be removed before the lead is dissolved. For example, the residual zinc compounds may be solubilized by the Mitchell process, as described in the U. S. Patents Nos. 1,979,281 and 1,943,340. As there set forth, the residual zinc sulfide, oxide, ferrate or ferrite and other compounds may be converted to zinc chloride and thus brought to a soluble condition. At the same time, the lead will be left in the ore material as lead sulfate and/or lead chloride. For the purposes of this process, it is preferable that no lead oxide be present, and this may be insured by employing a suitable procedure which converts any lead oxide to the chloride, or the lead sulfide may be initially converted to lead sulfate during the roasting operation. Hence, by leaching the finished residue of the Mitchell process with water, all of the soluble zinc chloride is removed therefrom and the residue is thus made zinc-free. In this particular process, it is not necessary, however, that all of the zinc be removed from the ore material, if zinc is to be found in the final product.

The zinc-free ore residue containing lead sulfate and/or lead chloride is now ready for dissolving the lead therefrom. This is preferably accomplished by means of a hot neutral salt brine which has the capacity of holding lead chloride in solution. The preferred procedure, therefore, involves carrying on the essential reactions in the presence of salt brine and we are, therefore, dealing with the chemistry of a brine solution instead of a water solution of a lead compound. The procedure of dissolving the lead preferably comprises leaching the ore residue with a strong neutral solution of sodium chloride in water, and especially one which is concentrated, while the temperature is maintained at approximately 75° C. It is desirable that the brine be acid-free so as not to dissolve iron or other undesired ingredients of the ore. The solubilizing operation may be carried on until the solution is substantially saturated with lead at this temperature of 75° C. Any lead remaining in the ore material may be suitably recovered in other operations not incident to the process herein described.

The hot lead bearing solution may now be raised to a temperature of approximately 84° C., at which point it is not saturated with respect to either the lead or the sodium chloride. The clear solution thus obtained will not clog a filter with precipitated lead chloride or crystallized sodium chloride or a compound thereof, nor will it permit the precipitation of such compounds during the subsequent process steps if the temperature should vary to a slight extent, as might happen if one were using a saturated solution. This hot lead bearing salt solution may be suitably treated in accordance with desired or standard procedure while held at about 84° C. so as to remove any foreign compounds therein, such as iron, which might be precipitated during the subsequent stages of the process. The purified solution is now ready for treatment to precipitate the lead therefrom. As above stated, the solution, while maintained at approximately 84° C., is treated serially, first to precipitate lead hydroxide and/or carbonate, then to precipitate lead sulfate and finally, if desired, to produce zinc hydroxide and/or zinc carbonate. These steps should be carried on serially in order to obtain the complex products herein desired.

In the first step, the lead salt brine, which may be considered to be a solution of $x\text{PbCl}_2.y\text{NaCl}$, may be treated with a limited amount of sodium carbonate and/or hydrate, or equivalents, to produce a precipitate of lead carbonate and/or hydrate and leave sodium chloride in solution. If both carbonate and hydroxyl ions are present, as is the case when a strong solution of sodium carbonate is employed, the product is a basic lead carbonate of the variable formula $$x\text{Pb(OH)}_2.y\text{PbCO}_3,$$

but it will be termed a carbonate whether or not hydroxyl is present. The relative amounts of the reacting compounds are proportioned to give the desired percentage of PbO in the final product, and suitable apparatus and technical procedure may be adopted. The precipitation is preferably accomplished by adding the reagent sodium compound slowly while rapidly stirring the hot lead sodium chloride brine. The reagent is used in a limited amount, since a considerable proportion of the lead is to be left in solution for the second stage.

In the second stage, the remaining lead in solution is precipitated as lead sulfate while the solution remains heated to a temperature which prevents the precipitation of the complex lead-sodium chloride crystals. In the preferred procedure and according to an important phase of this invention, zinc sulfate is employed as the precipitating reagent. By this method, the ore itself provides a sulfating reagent which in turn serves as a source of zinc in the final product, and no undesired ions are introduced into the system.

To these ends, zinc sulfate, either as a dry salt or preferably in a strong solution, is added to the pulp and brine solution from the first step in the required amount to precipitate the remaining lead, as determined by analysis of the zinc and lead solutions and stoichiometric calculations. The solution is maintained at 84° C. until all of the lead has been precipitated, and the mass is preferably stirred rapidly and thoroughly as the required amount of zinc sulfate is added. It is to be noted that the lead sulfate is precipitated in the presence of the lead compound first precipitated. Hence, the two are in intimate association and may be loosely joined by water of hydration as a complex compound in a crystalline structure. At any rate, they are closely associated in a finely divided particle, as is required in a satisfactory pigment, and the product is free from zinc. The brine solution, having thus been freed from lead, may now be permitted to cool for the further stages of the process.

The precipitate of lead carbonate and/or hydroxide intermixed or combined with lead sulfate may now be removed from the solution. It is then washed with a hot NaCl solution to dissolve any residual or occluded lead chloride or

which may remain with the precipitate. Thereafter, it may be washed with water. Finally, it is calcined to produce a pigment of the desired composition of $xPbO.yPbSO_4$. This is indicated on the drawing as an alternative procedure. After calcination, it may be again washed with water to remove any soluble salts produced by the calcining operation.

The solution of salt brine, sodium sulfate and zinc chloride which is obtained by filtering the lead pulp from its solution after the second precipitation step above described may be treated with a solution of sodium carbonate of suitable strength, or the dry salt, to precipitate the zinc therefrom as basic zinc carbonate. After filtering, washing and drying the precipitate, it may be calcined at a suitable temperature to remove the hydroxyl and carbonate content and form zinc oxide. Standard procedure may be adopted for this purpose.

If it is desired that the pigment contain zinc, then the second precipitated pulp is allowed to remain in the salt brine solution containing the zinc chloride formed during the previous precipitation step, and this mixture is now treated with sodium carbonate and/or hydroxide in desired form and proper proportions to precipitate a suitable amount of the zinc as zinc carbonate and/or hydroxide. If a strong solution of sodium carbonate is used, hydrolysis thereof causes the zinc carbonate to appear in the basic form or as $xZn(OH)_2.yZnCO_3$, but this will be herein termed zinc carbonate. By precipitating these various materials in the same solution and in association with such other precipitates as are present, it is believed that these ingredients likewise combine to a certain extent, and preferably by means of the water of hydration, so that the resultant material is not a simple mixture but may be considered as a crystalline compound. It is, however, immaterial as to whether the final product is a chemical compound or a mere mixture, in so far as the broader aspects of this invention are concerned. If all of the zinc in solution is to be precipitated, then the reagents are so proportioned that the final solution will contain no zinc therein; but, if desired, some zinc may be left in that solution. Then, after separation from the lead bearing pulp, the residual zinc in solution may be precipitated and recovered as desired, such as by adding sodium carbonate thereto, as described above.

The final basic lead sulfate, whether or not it contains zinc carbonate or hydroxide, may be calcined at a temperature between 600° C. and 900° C. at which the water of hydration and the carbon dioxide are driven off, with the resultant conversion of carbonates and hydroxides to oxides and the production of a compound or mixture of the general formula of $xZnO.yPbO.zPbSO_4$. The calcining temperature will, of course, be limited to prevent the oxidation of the PbO to the higher oxide form, as is well understood. In the above formula $xZnO.yPbO.zPbSO_4$, the letters $x$, $y$ and $z$ represent numbers the values of which depend upon the relative proportions of the zinc and lead contents of the original solution and the relative amounts of lead precipitated as a carbonate and/or hydroxide as compared with the amount precipitated as a sulfate.

The brine, after the precipitation of the zinc therefrom, in either of the procedures above described and as indicated on the drawing, is filtered or otherwise removed from the precipitate. It contains a high content of sodium sulfate, and this may be easily recovered by evaporation and crystallization. After separating the sodium sulfate crystals from the brine, the latter may now be returned to process, after adjusting its concentration at 75° C., whereby it may be re-used to dissolve more lead sulfate. The removal of a considerable part of the sodium sulfate is desirable, since its presence in the brine hinders the solubilizing of lead therein.

Instead of a solution of lead in a sodium or potassium chloride brine, one may employ other soluble lead compounds, such as a water solution of lead chloride or lead nitrate or lead acetate derived from suitable sources. Lead chloride in a hot water solution will follow the above procedure. Also, a lead nitrate solution of suitable concentration may be treated with the required amount of sodium carbonate to precipitate part of the lead as a carbonate and leave sodium nitrate in solution. Then, upon the addition of zinc sulfate to the pulp of precipitate and solution, the remaining lead nitrate may be precipitated as lead sulfate, with the formation of zinc nitrate in solution. This zinc bearing solution may be removed or left with the precipitate, as above described. In either case, the zinc may be precipitated from the nitrate solution by means of sodium carbonate, for example, thus forming zinc carbonate and leaving the nitrate ion in solution. The pulp may be removed from the solution and then calcined after suitable washing to form the desired end product. Likewise, the lead of the final product may be initially derived from lead acetate obtained from any source, and the same general procedure carried on. It will, therefore, be appreciated that this invention applies generally to the treatment of any suitable soluble salt of lead, and the broader claims in the case are to be thus interpreted as covering the other lead salts as full equivalents of the lead chloride in a salt brine, as herein specifically described.

Certain phases of this process are described and claimed in my copending application Serial No. 1,186 filed on even date herewith, now Patent No. 2,068,690, dated Jan. 26, 1937.

Having thus described the invention, what is claimed as new and desired to secure by Letters Patent is:

1. The method of treating an ore material containing lead and zinc compounds comprising the steps of forming therefrom separate aqueous solutions of a lead salt and of zinc sulfate, treating the lead salt solution with an alkali metal reagent capable of and proportioned for precipitating part of the lead as one of the group consisting of lead carbonate and lead hydroxide, then precipitating the remainder of the lead in the solution by adding said zinc sulfate thereto, and thereafter calcining the precipitates and forming a pigment thereof.

2. The method of claim 1 in which the lead sulfate is precipitated by adding the zinc sulfate directly to the pulp of the first formed precipitate intermixed with the resultant solution.

3. The method of producing a pigment comprising the steps of treating an aqueous solution of a lead salt with an alkali metal reagent furnishing ions of the group consisting of hydroxyl and carbonate ions which is capable of and is proportioned for precipitating only a part of the lead therefrom, then treating the pulp with zinc sulfate to precipitate lead sulfate, thereafter removing the precipitate and washing it and then calcining it to form the desired product.

4. The method of claim 3 in which the pulp containing the lead sulfate and zinc bearing solution is treated with an alkali metal compound capable of providing ions of the group consisting of carbonate and hydroxyl ions and of precipitating a zinc compound which may be calcined to the oxide form, so that upon calcination a product of the composition $x\text{ZnO}.y\text{PbO}.z\text{PbSO}_4$ is obtained.

5. The method of treating an ore material containing a lead compound comprising the steps of converting the lead compound to one of the group consisting of lead sulfate and lead chloride, dissolving the same in a hot alkali metal chloride brine, treating the hot lead salt solution with an alkali metal reagent providing ions of the group consisting of carbonate and hydroxyl ions and precipitating only a part of the lead, then treating the pulp with zinc sulfate proportioned to precipitate the remainder of the lead in the presence of the first precipitate, and thereby providing a compound capable of being calcined to form a pigment.

6. The method of claim 5 in which a sodium chloride brine containing the lead salt in solution is heated to a temperature at which it is not saturated with respect to either lead or sodium ions during the stages of precipitating the lead compounds therefrom.

7. The method of claim 5 in which a complex zinc and lead sulfide ore is roasted to form a zinc oxygen compound and lead sulfate and the roasted zinc compound is dissolved to form zinc sulfate and wherein the zinc sulfate is employed to precipitate the lead sulfate from its brine solution.

8. The method of claim 5 in which the pulp containing a zinc salt in solution is treated with an alkaline metal reagent providing ions of the group consisting of carbonate and hydroxyl ions to precipitate a desired content of zinc, after which the precipitate is separated from the resultant solution, washed and calcined to form a product of the composition $x\text{ZnO}.y\text{PbO}.z\text{PbSO}_4$.

9. The method of treating a sulfide ore material containing lead and zinc oxygen compounds of the group consisting of zinc oxide and sulfate and lead sulfate and chloride, comprising the steps of dissolving the zinc compound therefrom as zinc sulfate, dissolving the lead compound in a hot, alkali metal chloride brine, precipitating a part of the lead ions in solution by means of an alkali metal reagent providing ions of the group consisting of carbonate and hydroxyl ions, then treating the pulp with said zinc sulfate proportioned to precipitate the remainder of the lead ions as a sulfate and forming a solution containing zinc chloride, removing the precipitate from the solution and thereafter treating the zinc chloride solution with an alkali metal reagent providing ions of the group consisting of carbonate and hydroxyl ions and thus precipitating the zinc ions therefrom, recovering said precipitated zinc compound and calcining the same to zinc oxide.

10. The method of treating an aqueous solution of a lead salt of the group consisting of the nitrate, acetate and chloride of lead comprising the steps of adding to the solution a reagent of the group consisting of the carbonate and the hydroxide of an alkali metal which is capable of and proportioned for precipitating only a part of the lead therefrom, thereafter treating the resultant pulp of precipitate and solution with zinc sulfate which is proportioned for precipitating a further amount of the dissolved lead salt as lead sulfate, and calcining the precipitate under temperature conditions which will convert lead carbonate and hydroxide to the oxide.

11. The method of making a pigment comprising the steps of providing a hot alkali metal chloride brine having dissolved therein a lead salt of the group consisting of lead sulfate and lead chloride, treating the hot brine solution with an alkali metal reagent providing ions of the group consisting of carbonate and hydroxyl ions and precipitating only a part of the lead from the solution, then treating the pulp with zinc sulfate proportioned to precipitate the remainder of the lead in the presence of the first precipitate, thereafter treating the resultant precipitate and solution with an alkali metal reagent providing ions of the group consisting of carbonate and hydroxyl ions to precipitate zinc from solution, removing the precipitate, washing it, and then calcining it to form a product of the composition $x\text{ZnO}.y\text{PbO}.z\text{PbSO}_4$.

12. The method according to claim 5 wherein the solution resulting from adding zinc sulfate to the pulp is removed from the precipitate and evaporated to crystallize sodium sulfate therefrom and the resultant brine is separated from the crystals and returned for dissolving a further amount of the lead compound in a cyclic process.

13. The method of treating an aqueous solution of a lead salt of the group consisting of the nitrate, acetate and chloride of lead comprising the steps of adding to the solution a reagent of the group consisting of the carbonates and the hydroxides of an alkali metal which is capable of and proportioned for precipitating only a part of the lead therefrom, thereafter treating the resultant pulp of precipitate and solution with zinc sulfate proportioned for precipitating a further amount of dissolved lead salt as lead sulfate, treating the resultant pulp of precipitate and solution with an alkali metal carbonate to precipitate zinc carbonate therefrom, and thereafter separating the co-precipitated materials from the solution and calcining the precipitate at a temperature capable of converting the carbonates of lead and zinc to the oxides.

THOMAS A. MITCHELL.